(12) United States Patent
Lube et al.

(10) Patent No.: US 7,635,147 B2
(45) Date of Patent: *Dec. 22, 2009

(54) AIRBAG MODULE

(75) Inventors: Thomas Lube, Berlin (DE); Dirk Meissner, Berlin (DE); Heiko Hofmann, Berlin (DE); Andreas Winkler, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 9 days.

This patent is subject to a terminal disclaimer.

(21) Appl. No.: 12/000,199

(22) Filed: Dec. 10, 2007

(65) Prior Publication Data

US 2008/0150265 A1    Jun. 26, 2008

Related U.S. Application Data

(63) Continuation of application No. PCT/DE2006/001004, filed on Jun. 7, 2006.

(30) Foreign Application Priority Data

Jun. 10, 2005  (DE) ................ 10 2005 027 910
Dec. 15, 2005  (DE) ................ 20 2005 020 687 U

(51) Int. Cl.
   B60R 21/276    (2006.01)
(52) U.S. Cl. ............... 280/739; 280/740; 280/742
(58) Field of Classification Search .......... 280/739, 280/740, 742, 736
   See application file for complete search history.

(56) References Cited

U.S. PATENT DOCUMENTS

| | | | |
|---|---|---|---|
| 5,234,229 A | 8/1993 | Gordon | |
| 5,743,558 A * | 4/1998 | Seymour | .......... 280/739 |
| 5,799,974 A | 9/1998 | Honda | |
| 6,017,056 A | 1/2000 | Lee | |
| 6,290,257 B1 | 9/2001 | Bunce et al. | |
| 6,406,055 B1 | 6/2002 | Faigle et al. | |
| 6,692,022 B2 * | 2/2004 | Schenck et al. | .......... 280/739 |
| 6,736,425 B2 | 5/2004 | Lemon et al. | |

(Continued)

FOREIGN PATENT DOCUMENTS

DE    197 54 280 A 1    7/1998

(Continued)

OTHER PUBLICATIONS

Chinese Examination Report mailed Apr. 10, 2009, received in corresponding Chinese application No. 200680020729.9.

*Primary Examiner*—Ruth Ilan
(74) *Attorney, Agent, or Firm*—Foley & Lardner LLP

(57) ABSTRACT

An airbag module for a motor vehicle, including a cover. The airbag may be deployed through an openable region of the cover into the outside space of the airbag module. When the airbag is inflated, the outflow orifice is arranged in the inside space of the airbag module such that gas emerging from the first outflow orifice passes through the openable region of the cover. The gas generator includes at least one gas outlet orifice fluidly connected to the airbag. The airbag module further includes a second openable outflow orifice, which is formed on a chamber surrounding the gas generator and is in fluid communication with the gas outlet orifice of the gas generator so that the gas flowing out through the gas outlet orifice is conducted at least partially into the outside space.

37 Claims, 12 Drawing Sheets

U.S. PATENT DOCUMENTS

| | | |
|---|---|---|
| 7,401,809 B2 * | 7/2008 | Lube .................... 280/739 |
| 2001/0045734 A1 | 11/2001 | Damman et al. |
| 2003/0025309 A1 | 2/2003 | Schenck et al. |
| 2004/0113406 A1 * | 6/2004 | Elqadah et al. ............ 280/739 |
| 2004/0232675 A1 | 11/2004 | Marotzke |
| 2005/0046162 A1 | 3/2005 | Helmstetter |

FOREIGN PATENT DOCUMENTS

| | | |
|---|---|---|
| DE | 198 09 573 A1 | 9/1999 |
| DE | 198 10 537 A1 | 9/1999 |
| DE | 199 35 016 A1 | 2/2000 |
| DE | 203 13 367 U1 | 2/2004 |
| DE | 20 2004 009 936 U1 | 10/2004 |
| EP | 0 974 497 A1 | 1/2000 |
| EP | 1 279 574 A1 | 1/2003 |
| EP | 1 318 052 A1 | 6/2003 |
| WO | WO 98/31570 | 7/1998 |
| WO | WO 02/08025 A1 | 1/2002 |
| WO | WO 03/104046 A1 | 12/2003 |
| WO | WO 2004/094201 A1 | 11/2004 |

\* cited by examiner

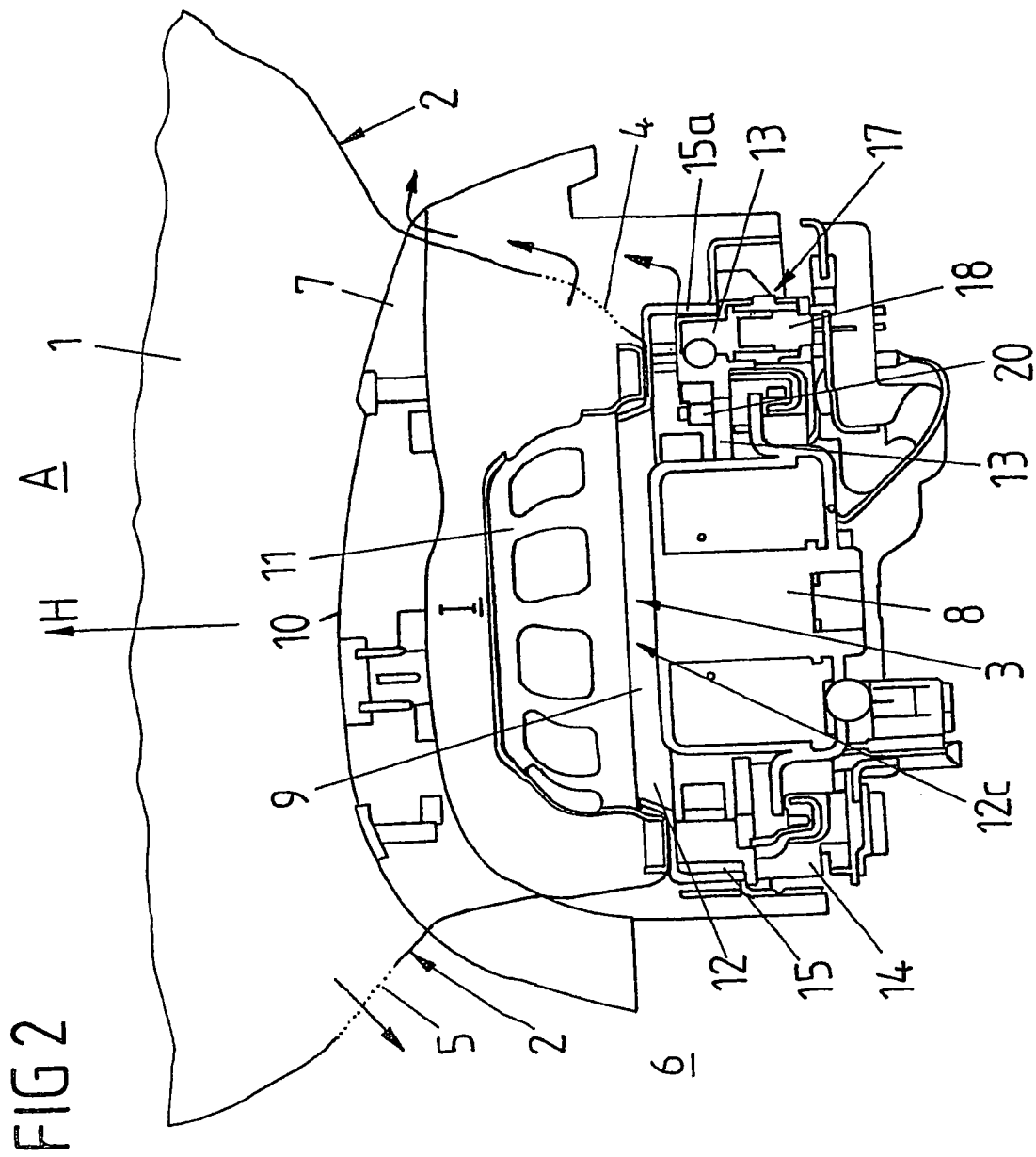

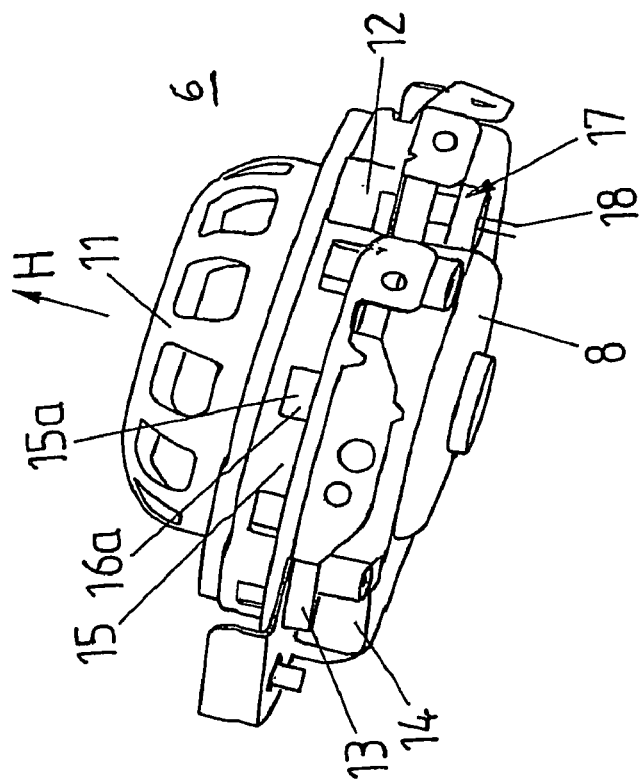
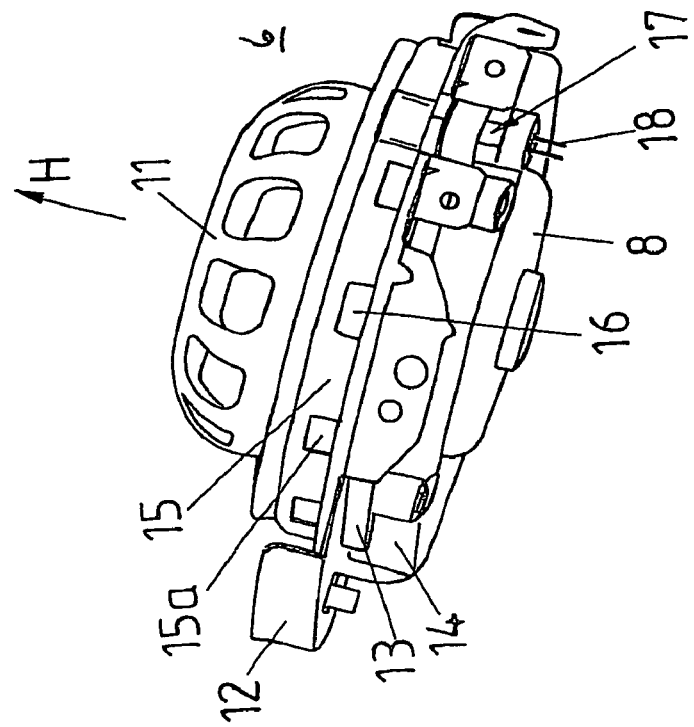

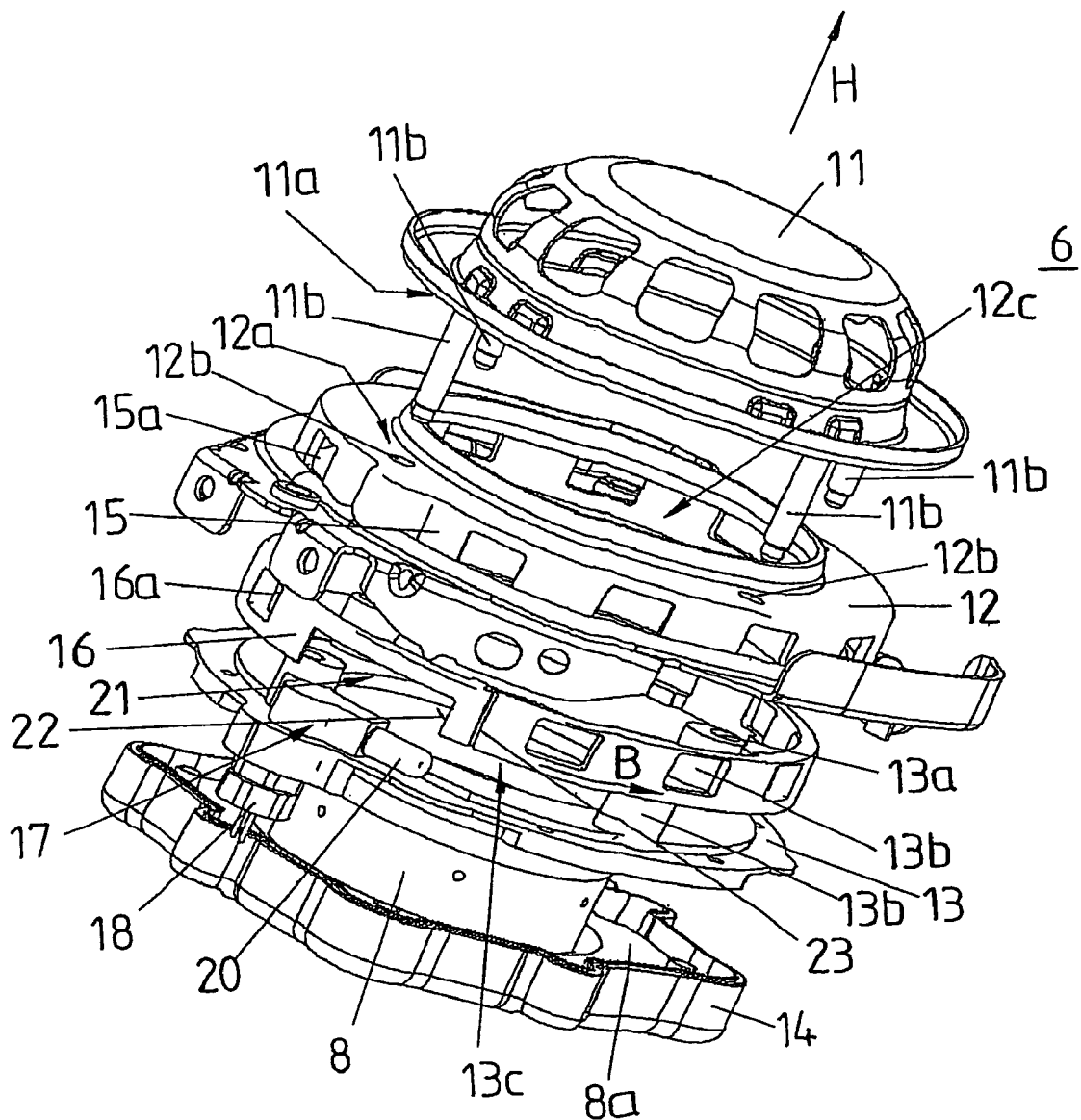

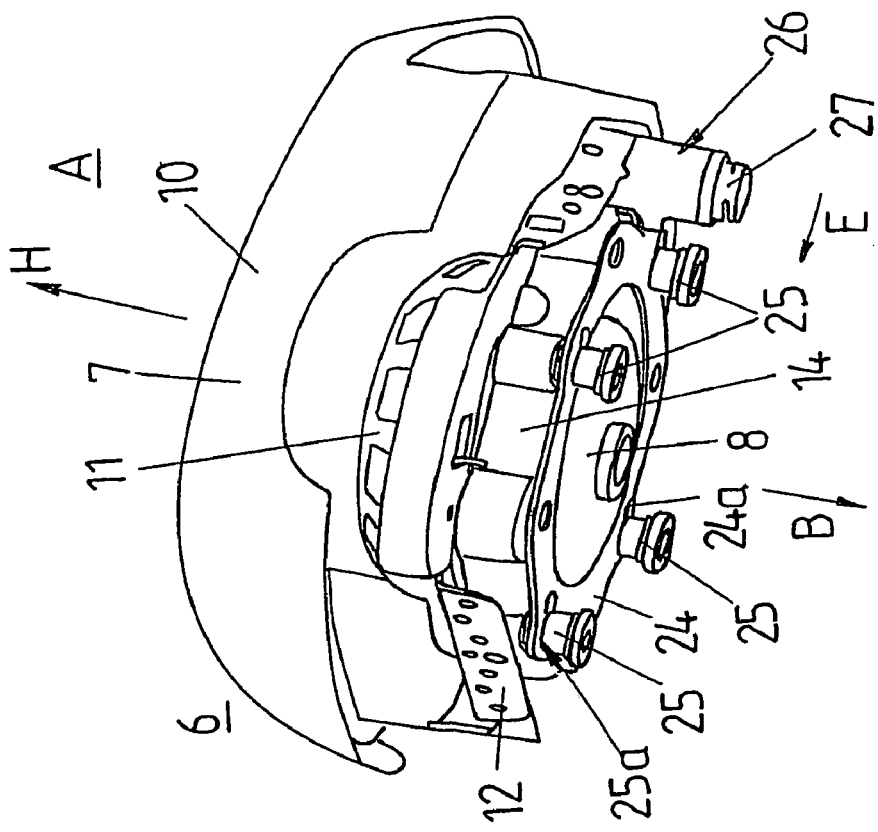
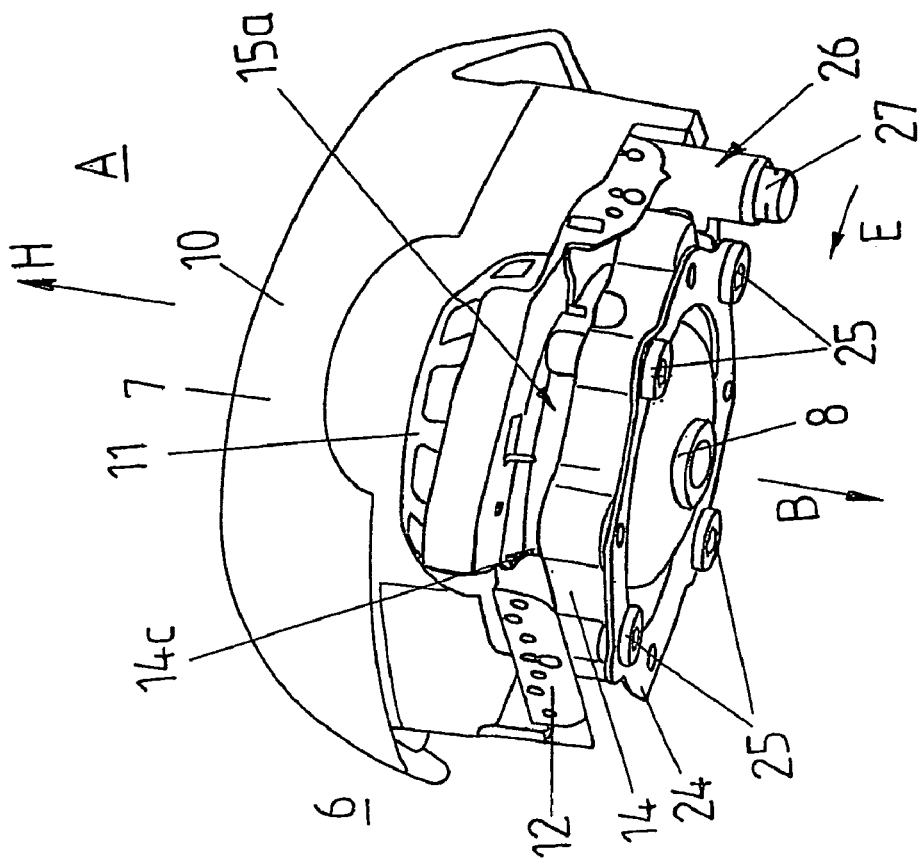

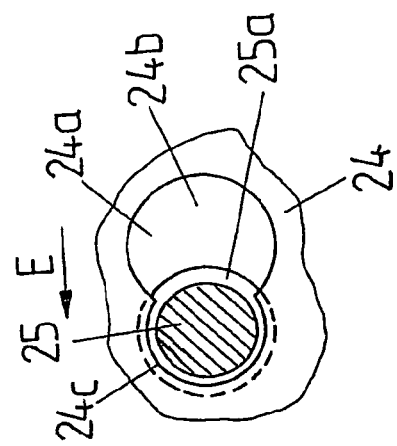
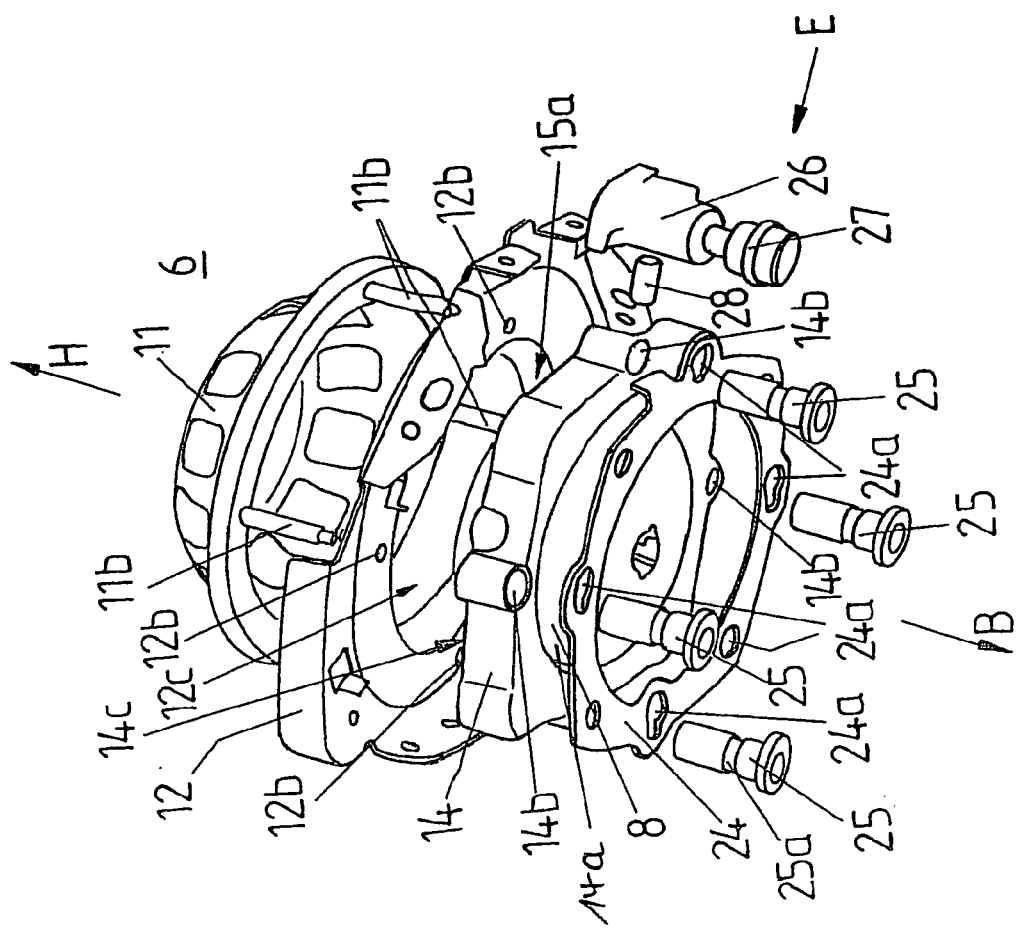

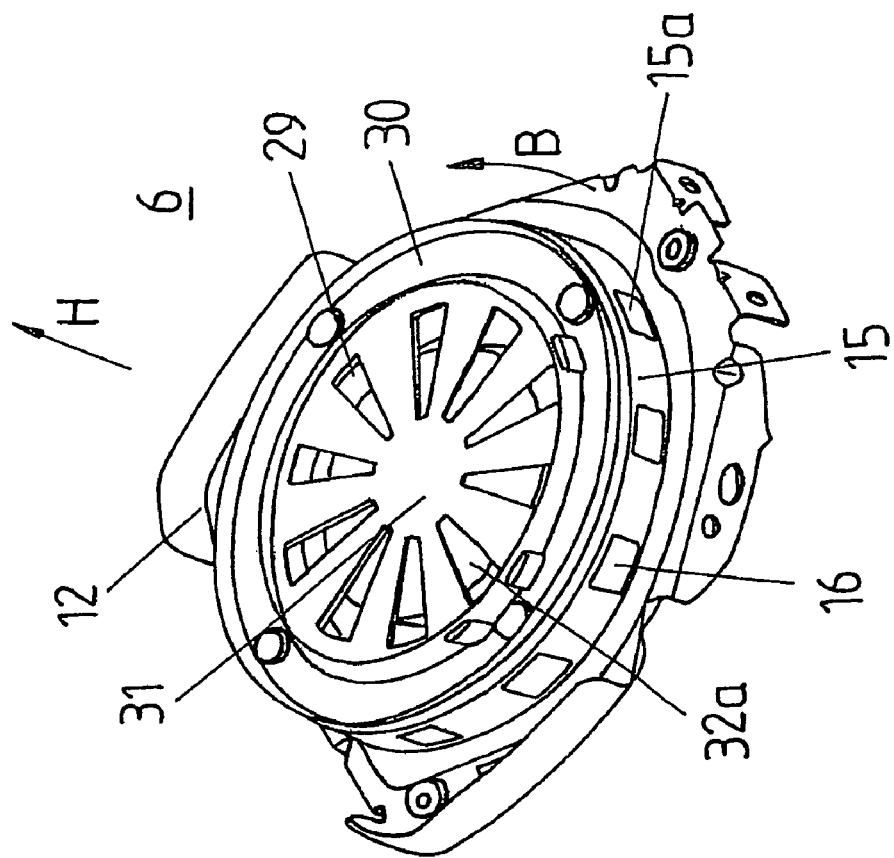
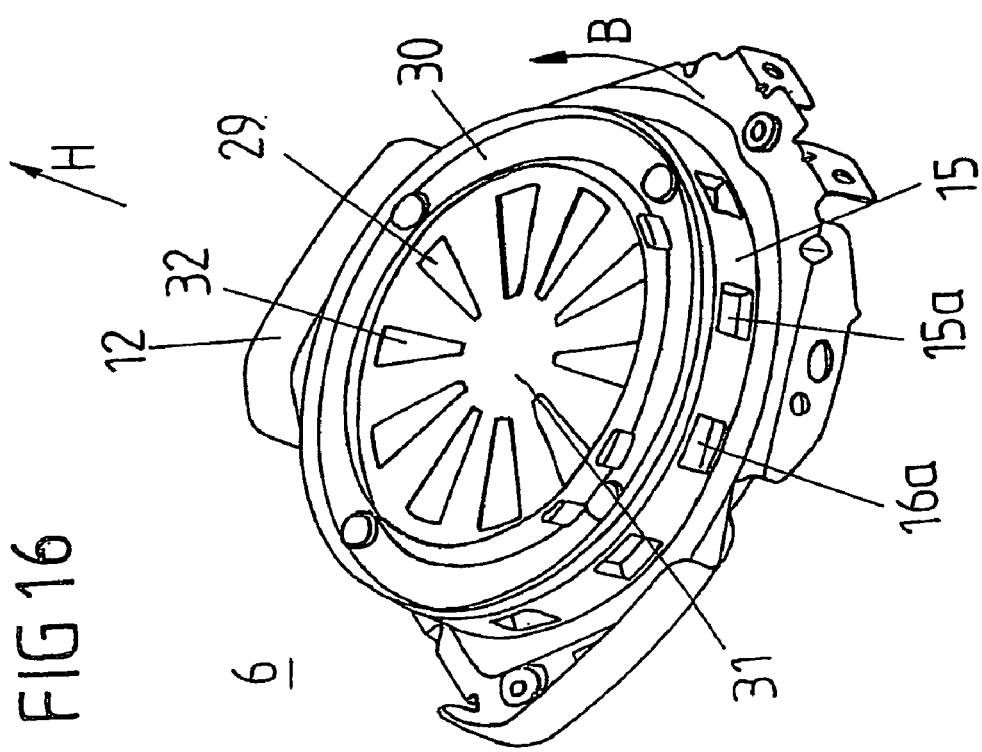

AIRBAG MODULE

CROSS-REFERENCE TO RELATED PATENT APPLICATIONS

This application is a Continuation of International Application PCT/DE2006/001004, which has an international filing date of filed Jun. 7, 2006; this International Application was not published in English, but was published in German as WO 2006/131110.

BACKGROUND OF THE INVENTION

The disclosure relates to an airbag module for a motor vehicle 1.

Airbag modules typically comprise at least one covering or cover for receiving an airbag and an airbag which may be inflated with gas through an injection orifice in order to protect an occupant. The cover separates an outside space of the airbag module from an inside space of the airbag module. The airbag is may be deployed by an openable region of the cover in the outside space of the module and having a first outflow orifice of the airbag module. The orifice is arranged in the inside space of the airbag module in an inflated state such that gas emerging from the first outflow orifice passes through the open openable region into the outside space. Furthermore, such an airbag module comprises a gas generator to generate a gas for inflating the airbag. The gas emerges from at least one gas outlet orifice of the gas generator and passes through the injection orifice into the airbag. The openable region of the cover may, for example, be opened by the airbag, pressing against the openable region during deployment in a main deployment direction. Tear-open lines may be provided on the cover, along which tear-open lines the openable region of the cover may be torn open.

It would be advantageous to provide a mechanism that improves the inflation behavior of an airbag module.

SUMMARY OF THE INVENTION

One embodiment relates to an airbag module for a motor vehicle, including a cover or covering for receiving an airbag, an airbag, a first outflow orifice of the airbag, and a gas generator. The cover separates an outside space of the airbag module from an inside space of the airbag module. The airbag may be inflated with gas through an injection orifice in order to protect an occupant, and may be deployed through an openable region of the cover into the outside space of the airbag module. In an inflated state of the airbag, the outflow orifice is arranged in the inside space of the airbag module such that gas emerging from the first outflow orifice passes through the openable region of the cover into the outside space. The gas generator generates the gas for inflating the airbag, which emerges from at least one gas outlet orifice of the gas generator and passing through the injection orifice into the airbag. The airbag module further includes a second openable outflow orifice, which is formed on a chamber surrounding the gas generator and is in fluid communication with the gas outlet orifice of the gas generator such that the gas flowing out through the gas outlet orifice is conducted at least partially into the outside space. The second outflow orifice is arranged such that gas emerging from the second outflow orifice passes into the inside space and from there through the openable region into the outside space.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 2 shows a diagrammatic partially sectional view of an airbag module according to the invention with first, second and third outflow orifices.

FIG. 3 shows a perspective view of an airbag module with closed second outflow orifices.

FIG. 4 shows a diagrammatic sectional view of the airbag module shown in FIG. 3, with opened second outflow orifices.

FIG. 8 shows a perspective exploded view of a modification of the airbag module shown in FIG. 3 to FIG. 6.

FIG. 12 shows a further variant of an airbag module according to the invention with a movably mounted gas generator and with an opened second outflow orifice.

FIG. 13 shows a perspective view of the airbag module shown in FIG. 12 with a closed second outflow orifice.

FIG. 14 shows a perspective exploded view of the airbag module shown in FIG. 12 and FIG. 13.

FIG. 15 shows a detail of the airbag module shown in FIG. 14.

FIG. 16 shows a perspective view of a chamber with controllable flow-out orifices which surrounds a gas generator of a variant of an airbag module according to the invention.

FIG. 17 shows the chamber shown in FIG. 16 with opened flow-out orifices.

DETAILED DESCRIPTION

Figure 1:
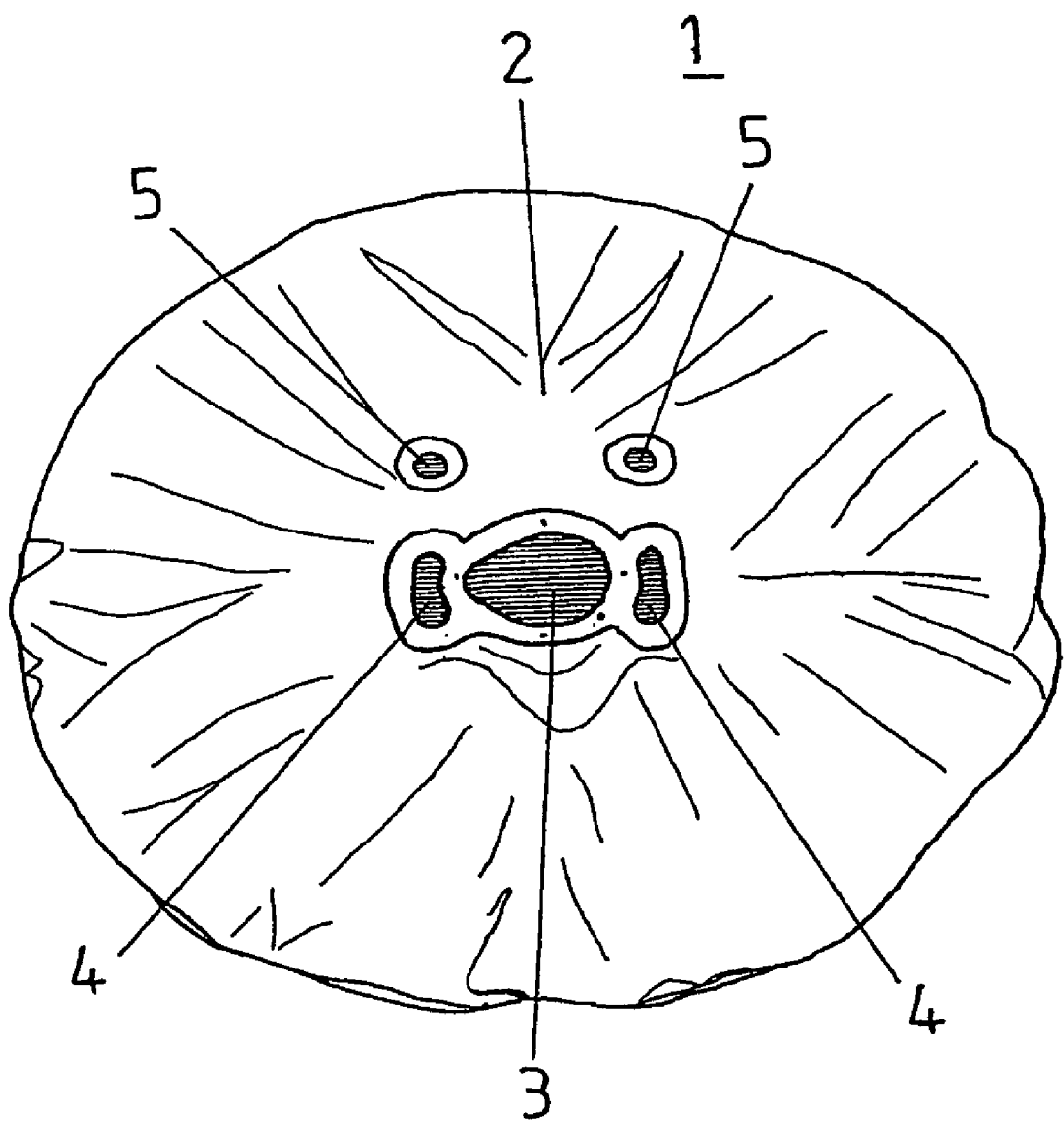
FIG. 1 shows a top view of a spread-out airbag with first and third outflow orifices and an injection orifice.
Figure 6:
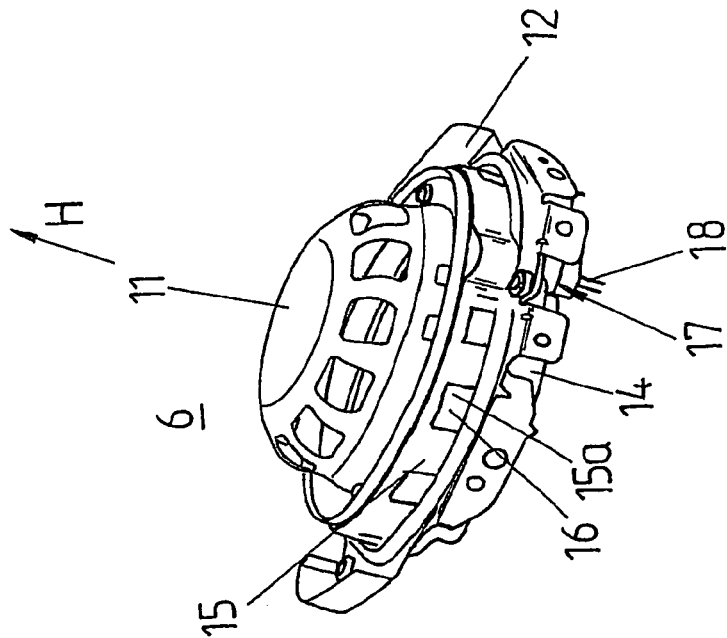
FIG. 6 shows a diagrammatic view of the airbag module shown in FIG. 5 (in an assembled state).

According to a disclosed embodiment an airbag module including a cover or covering and an airbag is disclosed. The cover separates an outside space of the airbag module from an inside space of the airbag module. The airbag includes an injection orifice for receiving inflation gas and is configured to deploy through an openable region of the cover into the outside space of the module. The airbag includes a first outflow orifice arranged in the inside space of the airbag module when the airbag is inflated so that gas emerging from the first outflow orifice passes through the open openable region into the outside space. The airbag includes a gas generator, by means of which the gas for inflating the airbag may be generated, the inflation gas emerging from at least one gas outlet orifice of the gas generator and passing through the injection orifice into the airbag. The openable region of the cover may, for example, be opened by the airbag as the airbag presses against the openable region during deployment in a main deployment direction. Tear-open lines may be provided on the cover, along which tear-open lines the openable region of the cover may be torn open.

According to the disclosed embodiments, the airbag module has a second outflow orifice connected to the gas outlet orifice of the gas generator so that the gas flowing out through the gas outlet orifice is conducted at least partially into the outside space.

This enables the inflation behavior of the airbag module to be adapted advantageously to specific situations. In an out-of-position situation, a person to be protected by the airbag may be at an insufficient distance from the airbag in a main deployment direction of the airbag. In such an out-of-position situation, the second outflow orifice (or a plurality of such outflow orifices) may be opened early, so that the airbag is inflated to a lesser extent, corresponding to the smaller distance between person and airbag, to avoid prematurely impacting the person.

Furthermore, this advantageously supports the reduction in a gas pressure which builds up in the airbag during the inflation, which reduction is brought about by the first outflow orifice (or a plurality of such orifices). The arrangement of such (permanently open) first outflow orifices in the inside space of the airbag module permits good ventilation of the airbag because of the high internal pressure in the airbag module during the inflation.

A time point is a simply controllable parameter of software used for controlling the second outflow orifice. Since the restraining performance of such an airbag module is adapted by the time point of an opening of the second outflow orifice, an airbag module of this type may be adapted and employed throughout a fleet of vehicles. This also applies to a changing motorization in the respective vehicle and to the adaptation to different statutory regulations and consumer tests.

In a particularly preferred variant of the invention, the airbag module has a second outflow orifice, which is assigned an element which is movable at least between two different positions and as a result of whose movement between the two positions the second outflow orifice is in fluid communication with the gas outlet orifice of the gas generator such that the gas flowing out through the gas outlet orifice is conducted at least partially into the outside space. According to one exemplary embodiment gas flowing out through the gas outlet orifice is conducted completely into the outside space surrounding the airbag module. An inflation of the airbag, for example in the event of an out-of-position situation, may therefore be prevented completely.

In one embodiment of the invention, there is provision for the second outflow orifice to be arranged in the inside space of the airbag module so that the gas passes through the openable region into the outside space. A person is therefore shielded from the gas, since the openable region is covered by the airbag being deployed. In addition, for example in the case of a driver's airbag, there is design freedom as regards a side of the steering column or of the steering wheel which faces away from the driver, since this side does not have to have a flow-optimized or heat-resistant construction in the case of an outflow of gas through an openable region, opened in the direction of a driver, of a cover of the airbag module.

In a further variant of the invention, for the discharge of gas, the airbag has a third outflow orifice which, with an airbag deployed, is arranged in the outside space of the airbag module. Third outflow orifices of this type are advantageous, since they allow a reliable venting of the "standing" or already deployed airbag. In the inflated state of the airbag, the third outflow orifice may be arranged on a side which faces the airbag module and faces away from the driver, so that the gases flowing out of the airbag are not aimed directly, or without being swirled around, at the driver or at a person to be protected by the airbag.

Preferably, a further third outflow orifice is provided that is arranged in the outside space of the airbag module. In the inflated state of the airbag, the further third outflow orifice preferably lies opposite the third outflow orifice transversely with respect to the main deployment direction of the airbag, so that, for example in the case of a symmetrically constructed driver's airbag, as symmetrical a gas radiation behavior as possible is brought about and the airbag may be (spatially) vented uniformly.

Preferably, the movable element is mounted movably in the airbag module so that said element is displaceable in a movement direction running parallel to the main deployment direction of the airbag. The movable element is displaceable and/or rotatable in a movement direction running parallel to the injection orifice.

According to another exemplary embodiment, the airbag module has a chamber which surrounds the gas generator of the airbag module. The chamber protects the airbag. The chamber may have openable (closable) outflow orifices (for introducing gas into the outside space) or flow-out orifice (for introducing gas into the airbag) or form such outflow orifices as a result of movements of components of the chamber. In an exemplary embodiment of the invention, the movable element is formed at least by the gas generator, preferably the gas generator being secured to the chamber so that the second outflow orifice is opened as a result of a movement of the gas generator in the movement direction. Preferably, the movement of the gas generator in the movement direction is brought about by pressure generated during the outflow of the gas.

Preferably, the chamber surrounding the gas generator is formed at least by a first and a second chamber element. One of the two chamber elements is connected to the gas generator, and the two chamber elements form a receptacle for the gas generator. The two chamber elements are mounted movably with respect to one another in the movement direction so they may be moved away from one another in the movement direction of the gas generator. The receptacle may be of a gap, running continuously around the gas generator at the chamber between two continuous margins facing one another in the movement direction.

Preferably, the two chamber elements are mounted movably with respect to one another via guide elements extending longitudinally in the movement direction. Guide elements of this type may be connected in one piece to one of the two chamber elements and project in the movement direction from this chamber element or a further component of the chamber. The other chamber element may then have recesses (for example, continuous holes), into which these guide elements engage. The guide elements couple one chamber to the other so they may move relative to each other in the movement direction.

According to another exemplary embodiment, the airbag may be secured to the first chamber element while the gas generator is secured to the second chamber element. In the case of a driver's airbag, the first chamber element is arranged in the main deployment direction of the airbag between the second chamber element and a driver to be protected by the airbag. Particularly preferably, the second chamber is spaced apart from the first chamber element as a result of a movement of the gas generator in the movement direction of the gas generator, the second outflow orifice, for example in the form of a gap running continuously around the gas generator transversely with respect to the movement direction, being formed between the two chamber elements in the movement direction. The second outflow orifice is opened as a result of this movement of the two chamber elements apart from one another.

According to another exemplary embodiment, a releasable locking element is provided to secure the gas generator with respect to the injection orifice. The locking element may fix the gas generator in its initial position during the inflation of the airbag and is activatable by control electronics so that an unlocking of the locking element may take place at a specific time point as a function of a specific accident situation. The pressure arising during outflow of gas presses the gas generator against the locking element. After a release or unlocking of the locking element, the gas generator moves away from the injection orifice of the airbag in the movement direction into a further position which is spaced apart from the initial position.

Preferably, the locking element may be brought into engagement with the guide elements (the locking element may, for example, latch positively on the guide elements) in order to secure the gas generator with respect to the injection orifice of the airbag.

Particularly preferably, the locking element is set up and may be brought at least partially out of engagement with the guide elements. The guide elements may move linearly in an unlocking direction running transversely with respect to the movement direction of the gas generator. In such an embodiment, the locking element may have long holes which extend longitudinally in the unlocking direction and pierce the unlocking element in the movement direction and at which the guide elements latch in order to secure the gas generator. These long holes may widen in the unlocking direction, the guide elements being introducible in the movement direction into a widened region of these long holes and having notches, into which the locking element may engage. The locking elements engage marginal regions which border the long holes at their respective narrow regions so that the guide elements press against these marginal regions in the movement direction and are therefore secured in the movement direction.

A narrow region of a long hole and a widened region of a long hole which lies opposite in the unlocking direction may be divided off from one another transversely with respect to the unlocking direction by a contraction or narrowing of the long hole. This is advantageous, since a guide element may thereby be pressed with its annularly continuous notch into the narrow region and be held there by the contraction. A displacement of a guide element located in a narrow region in the unlocking direction into a widened region of a long hole therefore presupposes a predefinable minimum force and reduces the risk of an unintentional unlocking of the locking element.

According to another exemplary embodiment, a movement generation device is provided, which generates the linear movement of the locking element in order to release the locking element. In this case, this movement generation device preferably has a piston which presses against the locking element in the unlocking direction, the guide elements being displaced out of the narrow regions of the long holes into the widened regions of these long holes, so that they may slide in the long holes transversely with respect to the unlocking/moving direction. Broadenings may be formed on the locking elements in the movement direction, so that the locking element does not come completely out of engagement with the guide elements when it slides along the guide elements. There is therefore a maximum possible distance between the two chamber elements in the movement direction.

According to another exemplary embodiment, the one or more second outflow orifices are formed on a chamber surrounding the gas generator, the gas generator having a fixed position with respect to the injection orifice (with the exception of compensating movements which are possible due to an oscillatable mounting of the gas generator). The movable element is mounted movably on this chamber and the second outflow orifice may be closed or opened by the movable element.

According to another exemplary embodiment, there is provision for the chamber of the gas generator to have a cylindrical wall on which the second outflow orifice is arranged. The cylindrical wall may run continuously around the gas generator transversely with respect to the main deployment direction of the airbag of the airbag module. In this instance, the gas outlet orifice of the gas generator (or a plurality of such gas outlet orifices) faces the second outflow orifice (or a corresponding plurality of such second outflow orifices) transversely with respect to the main deployment direction of the airbag, so that the gas may first flow transversely with respect to the main deployment direction out of the chamber surrounding the gas generator.

Preferably, the movable element has a cylindrical ring with a clearance, the ring being mounted displacably on the wall of the chamber so that the clearance may be brought into congruence with the second outflow orifice as a result of a displacement of the ring along the wall. The clearance of the ring may have the shape and size of the second outflow orifice. The cylindrical ring has a plurality of clearances which may be brought into congruence with a plurality of second outflow orifices which may be formed along the cylindrical wall as a result of a displacement of the ring along the wall. A displacement of the ring is understood in this context to mean a rotation of a cylindrical ring about its cylinder axis. The cylindrical ring may bear against the wall and be rotated against the wall, may translate along the wall, or may both rotate and translate relative to the wall.

The clearance (or clearances) of the ring is formed on the ring that the ring may be rotated or slid with respect to the wall of the chamber into a position in which the ring completely closes the second outflow orifice (or the plurality of second outflow orifices). The clearances may likewise be arranged on the ring that all the second outflow orifices of the wall are opened in a specific position of the ring with respect to the wall.

Particularly preferably, to displace the ring in the movement direction, the ring has a recess with a margin extending transversely with respect to the movement direction (in the case of a cylindrical wall, the movement direction runs around the cylindrical wall preferably transversely with respect to the main deployment direction of the airbag. According to another exemplary embodiment, this recess is a gap which interrupts the ring and which extends transversely with respect to the movement direction.

Preferably, a piston of a movement generation device presses against the margin of the recess in the movement direction, so that the ring is pushed by the piston out of an initial position (e.g., where the second outflow orifice is closed) into a further position (e.g., where the second outflow orifice is opened). By virtue of this advantageous tangential introduction of force, the ring is deformed only slightly. To reinforce the ring, the recess may be formed only partially on the ring and may not sever the ring completely perpendicularly to the movement direction. A narrow further recess is provided that severs the ring transversely with respect to the movement direction and that is formed behind the margin of the recess in the movement direction and runs along this margin, (e.g., transversely with respect to the movement direction). The further recess prevents the ring from pushing in the movement direction if the piston of the movement generation device presses against the margin of the recess in the movement direction. Instead, the ring is pulled reducing the deformation of the ring caused by the piston action.

Pulling the ring allows the ring to have a particularly lightweight design (small wall thickness). Furthermore, the clearance of the ring may be brought into congruence with the second outflow orifice in order to open the second outflow orifice. The clearance of the ring may have a particularly large area as a result of the minimization of the deformation of the ring. The clearance (or clearances) may therefore occupy about half of a surface of the ring which faces the wall of the chamber.

According to another exemplary embodiment, the chamber surrounding the gas generator may have a closable flow-out orifice through which gas generated or released by the gas generator may pass into the airbag in order to inflate the airbag. Preferably, one or more flow-out orifices are arranged on a flow-out region, facing the injection orifice of the airbag, of the chamber.

Particularly preferably, the movable element of the airbag module has a valve plate with an orifice, the valve plate being mounted movably on the wall of the chamber. The orifice may be brought into congruence with the flow-out orifice as a result of a displacement (rotation) of the valve plate along the flow-out region. A plurality of orifices are provided on the valve plate and may be brought into congruence with a plurality of corresponding flow-out orifices formed on the flow-out region as a result of the displacement or rotation of the valve plate, with the result that the flow-out orifices of the chamber may be opened.

Furthermore, the orifice or orifices is or are formed on the valve plate that, as a result of the rotation of the valve plate with respect to the outflow region over a predeterminable angle, said valve plate closes all the flow-out orifices of the flow-out region of the chamber.

According to another exemplary embodiment, the valve plate may be secured to a continuous margin facing the airbag or the injection orifice of the airbag of the ring. The movable element may be a flat cylinder open on one side, the ring forming the cylinder wall, and one bottom of this cylinder being formed by the (circular) valve plate.

Preferably, the orifice of the valve plate is arranged with respect to the clearance of the ring that the flow-out orifice is closed by the valve plate when the second outflow orifice of the wall of the chamber is open and the flow-out orifice is open when the second outflow orifice is closed by the ring. The same applies correspondingly to a plurality of orifices of the valve plate or flow-out orifices of the chamber and to a plurality of second outflow orifices of the chamber or clearances of the ring.

The additionally provided controllable flow-out orifices of the chamber are advantageous, since not only does an additional flow path for relieving the pressure of the airbag become possible, but the path of the gases into the airbag may be shut off completely, so that a further reduction in the load on the occupants under out-of-position conditions is possible.

Advantageously, the first, second and third outflow orifices may be combined with one another and coordinated with one another. In this case, the first and third outflow orifices in the airbag replace the standard outflow orifices with which an airbag is normally equipped. The coordination of the ratio of the area of the first outflow orifices in respect of the third outflow orifices takes place so the in-position performance (the airbag may be deployed freely, unimpeded) corresponds to that of a known standard airbag.

While the first and third outflow orifices are open permanently, the second outflow orifices are switchable or controllable. The opening of these second outflow orifices takes place as a function of time after the ignition of the gas generator (for example, by a pyrotechnic movement generation device). In the event of a premature opening of these second outflow orifices, the mass flow of the gas generator is blown off beneath an airbag tie-up (for example, by the clamping of a marginal region, running continuously around the injection orifice of the airbag, to a generator carrier) and consequently the degree of filling of the airbag is influenced, a more effective restraining performance ("softer" airbag) for lighter occupants (5%, woman) being achieved at the same time with additional first and third outflow orifices. In the event of a later opening of the switchable or controllable first outflow orifices, the restraining performance for heavy occupants (50% and 95%, man) is improved. The deployment of the airbag may be assisted (early restraint due to a rapid airbag provision) by a better rectangular identification of the acceleration values (deceleration) of a vehicle occupant in an accident situation triggering the airbag module. Overall, optimal damping of the airbag as a function of the occupant may be set by the time point of the opening of the additional outflow area (second outflow orifices) being selectable in a directed way. The fixing of the opening time point may take place automatically on the basis of occupant sensing (size, weight, position) and a sensing of crash-dependent data (deceleration, speed).

In out-of-position situations, there is the possibility, by the very early opening of the switchable second outflow orifices, of additionally minimizing the pressure in the airbag module in order further to reduce the load acting on the occupant when he is hit by the airbag.

In contrast to known airbag modules, the gases conducted into the airbag module are not conducted through orifices of a generator carrier further downward along the steering axle into the steering wheel body, but, instead, are deflected along the steering axle or the main deployment direction of the airbag in the direction of the openable region of the cover of the airbag module. The emergence of the gases therefore takes place along the airbag through the openable region of the cover. Since, even in an out-of-position situation, the body parts of an occupant which are near the airbag module are covered sufficiently by the airbag, the body parts are shielded from the hot gases which have flowed out. In addition, on account of the above-described flow path through the openable region of the cover, no adjacent subassemblies are adversely affected. Additional measures on the steering wheel in order to ensure the outflow are therefore unnecessary. At the same time, the situation is avoided where the hands on the steering wheel are exposed to hot gasses that outflow through the steering wheel.

Further advantages and features of the invention will become clear from the following figure descriptions of exemplary embodiments.

FIG. 1 shows an airbag 1 which is designed for use as a driver's airbag. The airbag 1 is spread out along a plane of extent coinciding with the paper plane and consists of two circular gasbag plies, the continuous margins of which are stitched, adhesively bonded, woven or welded to one another to form the airbag.

The airbag 1 has a side 2 which, in an inflated state of the airbag 1, faces an airbag module 6, not shown in FIG. 1, or faces away from a driver who is to be protected by the inflated airbag 1.

On the side 2 of the airbag 1, an injection orifice 3 in the form of a circular orifice is provided centrally, through which gas for inflating the airbag 1 may be introduced in the airbag 1.

The airbag 1 has two first outflow orifices 4 which are formed on two mutually opposite marginal regions of the injection orifice 3 and which extend longitudinally along the injection orifice 3. These two first outflow orifices 4 are arranged adjacently to the injection orifice 3 that, in the inflated state of the airbag 1, they are arranged in an inside space I of the airbag module 6.

Furthermore, the airbag 1 has third outflow orifices 5 which are in each case at a distance from the center of the circular injection orifice 3 which is greater than the distance of the first outflow orifices 4 from the center of the injection orifice 3. This distance is large enough that, in an inflated state of the airbag I, the third outflow orifices 5 are arranged outside the inside space I of the airbag module 6, specifically in the outside space A surrounding the airbag module.

FIG. 2 shows, in conjunction with FIGS. 3 to 7, a partially sectional view of the airbag module 6 which has a cover 7 which forms a receptacle for the airbag 1 of the airbag module 6 and for a gas generator 8 and a chamber 9, surrounding the gas generator 8, of the airbag module 6.

The cover 7 of the airbag module 6 separates the inside space I from the outside space A of the airbag module 6. Furthermore, on the cover 7 of the airbag module 6, an openable region 10 is provided, which tears open, for example along predefined tear-open lines, when as a result of the gas pressure building up in the airbag 1, the airbag 1 presses from the inside space I against the openable region 10 of the cover 7 of the airbag module 6 in a main deployment direction of the airbag. The inside space I is understood in this context to mean the space which the airbag 8 occupies in its uninflated state. The inside space I is delimited by the unopened cover 7 in the main deployment direction H of the airbag 1.

FIG. 2 shows the airbag module 6 after the airbag 1 (an extract of which is illustrated in FIG. 2) has spread out through the openable region 10 of the cover 7 into the outside space A of the airbag module 6, the third outflow orifices 5 of the airbag 1 being arranged in the outside space A, and the second outflow orifices 4 being arranged in the inside space I of the airbag module 6. The flow path is identified diagrammatically in FIG. 2 by corresponding arrows.

While the gas located in the airbag 1 may flow through the third outflow orifice 5 directly into the outside space A, the gas is introduced through the second outflow orifice 4 first into the inside space I and from there along the airbag 1 through the openable region 10 into the outside space A.

The chamber 9 surrounding the gas generator 8 is formed by a cap-shaped diffuser 11, a generator carrier 12, a bottom plate 13 and a carrier 14 for the gas generator 8 mounted oscillatably on the carrier 14. The diffuser 11 has a cap-shaped design and projects in the main deployment direction H through the injection orifice 3 into the (inflated) airbag 1, a marginal region which runs continuously around the injection orifice 3 of the airbag 1 being arranged in the main deployment direction H of the airbag between a continuous marginal region 11a of the diffuser 11 and a continuous marginal region 12a, which runs continuously around a central orifice 12c, facing the injection orifice 3, of the generator carrier 12, and being clamped (airbag clamping) between these two marginal regions 11a, 12a facing one another in the main deployment direction H.

The diffuser 11 and the generator carrier 12 are via four fastening elements 11b which project longitudinally from the marginal region 11a of the diffuser 11 in the main deployment direction H (the four fastening elements 11b are arranged along the annular marginal region 11a equidistantly from the next respective adjacent fastening element along the marginal region 11a). These four fastening elements 11b are guided through corresponding holes 12b which are formed on the marginal region 12a of the generator carrier 12, so that free end portions of these fastening elements 11b project from a side of the marginal region 12a of the generator carrier 12 which faces away from the diffuser 11. These projecting free end portions are introduced, furthermore, into corresponding (continuous) holes 13a of the bottom plate 13, the holes 13a being formed in cylindrical fastening regions 13b of the bottom plate 13 which (like the holes 13a) are in alignment with the fastening elements 11b and the main deployment direction H.

The bottom plate 13 possesses a central circular gas generator clearance 13c which lies opposite the central orifice 12c of the generator carrier 12 and the injection orifice 3 of the airbag 1 in the main deployment direction H.

The essentially cylindrical gas generator 8 is introduced in the main deployment direction H into this gas generator clearance 13c of the bottom plate 13. The gas generator 8 is connected oscillatably to a carrier 14 of trough-shaped design via a flange 8a which projects from the gas generator 8 transversely with respect to the main deployment direction H and which runs continuously around the gas generator 8 transversely with respect to the main deployment direction H. An oscillatable tie-up of the gas generator 8 to the carrier 14 via the flange 8a is not absolutely necessary. Furthermore, the flange 8a itself may be shaped as the carrier 14, so that the carrier 14 and gas generator 8 are connected to one another directly.

The carrier 14 is secured to free ends of the end portions of the fastening mechanisms 11b which are led through the holes 13a of the bottom plate 13 and closes the chamber 9 of the gas generator 8 on a side lying opposite the diffuser 11 in the main deployment direction H.

Furthermore, the generator carrier 12 has a cylindrical wall 15 which is oriented perpendicularly to the central orifice 12c of the generator carrier 12 and which runs continuously around the central orifice 12b of the generator carrier 12 annularly transversely with respect to the main deployment direction H. A plurality of first outflow orifices 15a are formed on this wall 15 of the generator carrier 12 and may be closed or opened by a movable element in the form of a cylindrical ring 16.

The cylindrical ring 16 bears against an inside, facing the gas generator 8, of the cylindrical wall 15. The cylindrical ring runs continuously around the cylindrical wall 15 and is displaceable between two positions in a movement direction B running transversely with respect to the main deployment direction H. The cylindrical ring 16 may be rotated about its cylinder axis coinciding with the main deployment direction H.

Clearances 16a having the configuration of the outflow orifices 15a of the wall 15 are provided on the ring 16 and are arranged along the cylindrical ring 16 so that they may be brought completely into congruence with the second outflow orifices 15a of the wall 15. In the event that the second outflow orifices 15a and clearances 16a are brought into congruence, the second outflow orifices 15a are opened completely, so that gases provided by the gas generator 8 may pass through the second outflow orifices 15a into the inside space I and from there into the outside space A of the airbag module 6. By the ring 16 being rotated or displaced, the clearances 16a of the ring 16 may be brought out of congruence with the second outflow orifices 15a of the wall 15 of the generator carrier 12. In this instance, the second outflow orifices 15a are closed completely by the ring 16.

Figure 7:
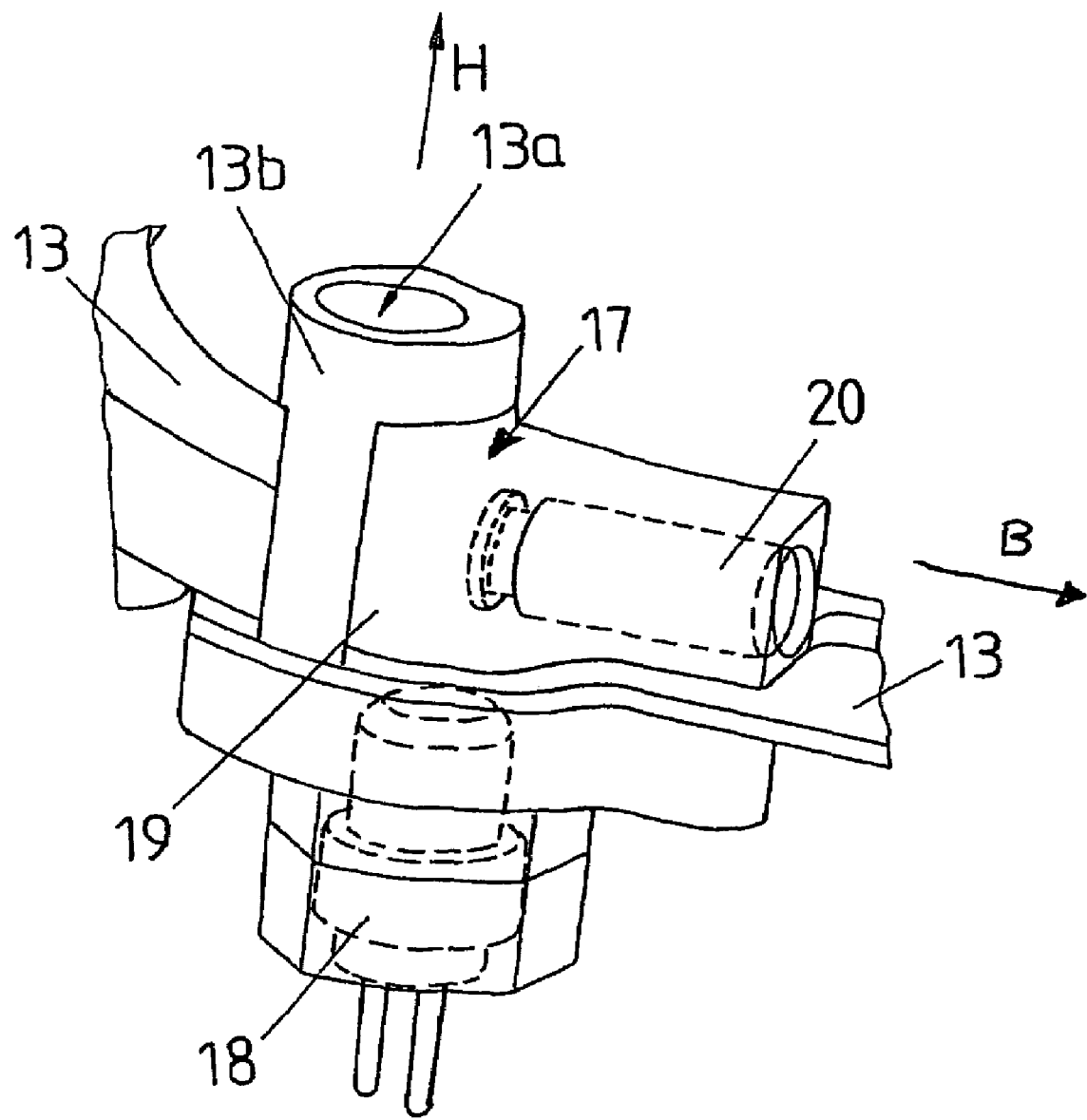
FIG. 7 shows a pyrotechnic movement generation device with an igniter and a piston.

According to FIG. 7, a movement generation device 17 in the form of a pyrotechnic actuator is provided on the bottom plate 13 so that the cylindrical ring 16 may be displaced in the movement direction B in order to open the initially closed outflow orifices 15a. The movement generation device 17 has an igniter 18 that is activatable or ignitable, by control electronics and that may generate an excess pressure in a pressure chamber 19 formed in the bottom plate 13. The excess pressure may press a longitudinally extended piston 20, mounted movably in the pressure chamber 19, out of the pressure chamber 19 in the movement direction B.

To transmit the piston movement, the piston 20 is arranged in the movement direction B in a recess 21 of the ring 16. The recess 21 obstructs the ring 16 in the movement direction B. Excess pressure provided in the pressure chamber 19 presses the piston 20 in the movement direction B against a margin 22, running transversely with respect to the movement direction B, of the recess 21 of the ring 16, so that the piston 20 is rotated in the movement direction B with respect to the wall 15 in order to open the second outflow orifices 15a. The recess 21 may also be a clearance 16a in the ring 16.

The piston 20 is arranged in the movement direction B and may press tangentially with respect to the ring 16 against that edge 22 of the ring 16 which faces it. Deformations are thereby mitigated, which may occur if a piston 20 of this type presses, spaced apart radially from the ring 16, against a region projecting from the ring, in order to rotate the ring with respect to the wall 15. The ring 16 may be produced in an optimized way in terms of material and of weight.

So that the ring 16 may be displaced reliably along the wall 15 of the generator carrier 12 by the piston 20, guide mechanisms that guide the cylindrical ring 16 in the movement direction B are provided on the generator carrier 12 and/or the bottom plate 13. The bottom plate 13 has a guide mechanism of this type, specifically in the form of a step which runs continuously around the gas generator clearance 13c and along which a margin, facing the bottom plate 13, of the ring 16 may slide.

Figure 5:
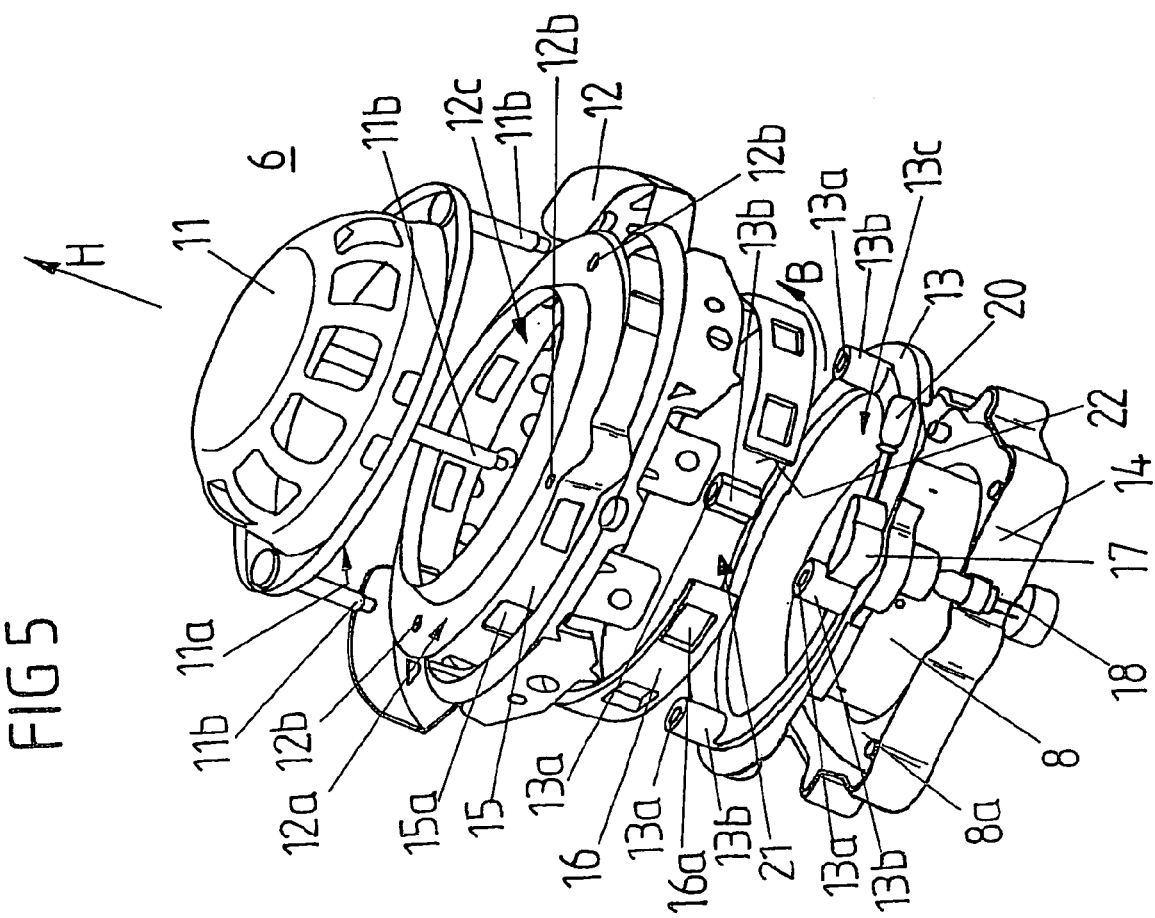
FIG. 5 shows an exploded illustration of the airbag module shown in FIG. 3 and FIG. 4.

FIG. 8 shows a modification of the airbag module 6 shown in FIG. 5, in which, in contrast to FIG. 5, the ring 16 is not interrupted in the movement direction B by the recess 21. The recess 21 of the ring 16 is formed, here, on that margin of the ring 16 which faces the bottom plate 13 to form a margin 22 running transversely with respect to the movement direction B of the recess 21. The piston 20 may press against margin 22 to displace the ring 16. However, in the modification of the airbag module 6, as illustrated in FIG. 8, the ring 16 is not pushed in the movement direction B by the piston 20, as in FIG. 5, but, instead, is pulled by the piston 20 pressing against the margin 22, since, in front of the margin 22 of the recess 21 of the ring 16 in the movement direction B, a further recess 23 in the form of a gap is formed, which runs parallel to the margin 22 and which interrupts the ring 16. As a result, the ring 16 is not pushed in the movement direction B by the piston 20 pressing against the margin 22 in the movement direction B, but, instead, is pulled in the movement direction B by the piston 20 pressing against the margin 22. This is advantageous, since a deformation of the ring 16 brought about by the piston 20 may thereby be reduced effectively.

Figure 10:
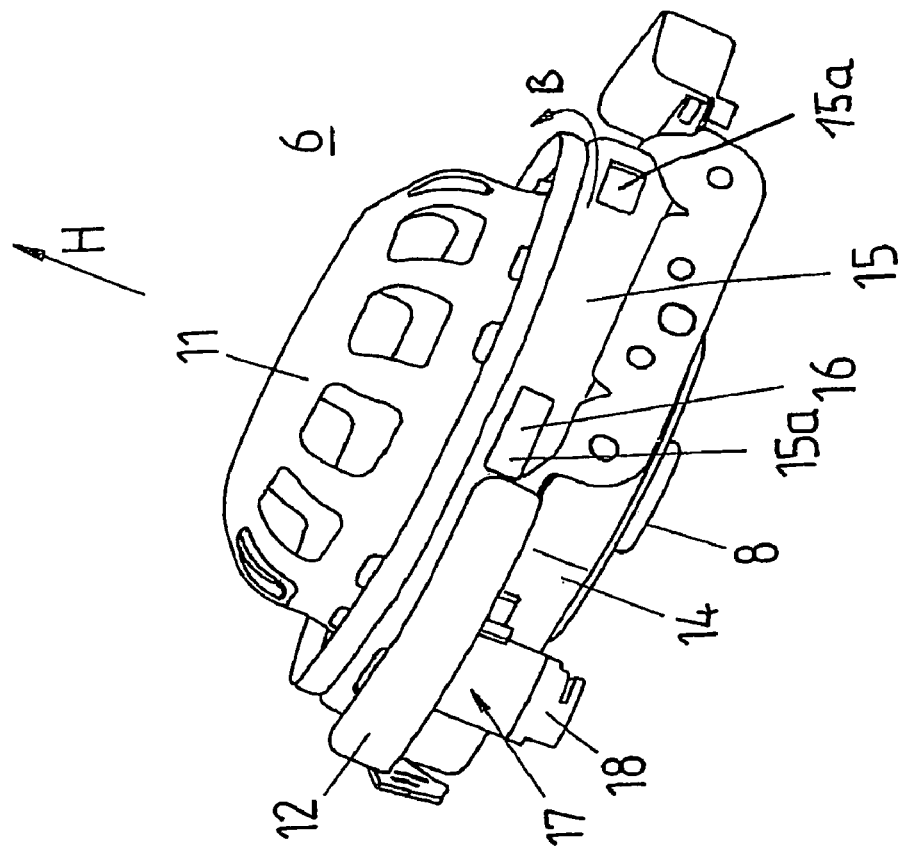
FIG. 10 shows a perspective view of the airbag module shown in FIG. 9 with closed second outflow orifices.
Figure 9:
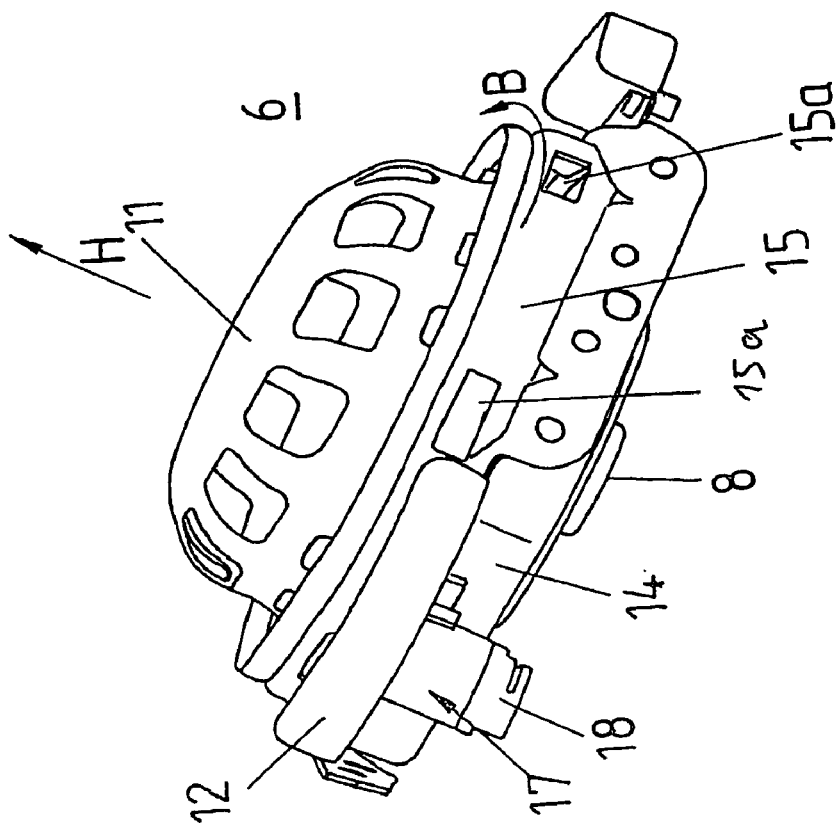
FIG. 9 shows a perspective view of a further modification of an airbag module according to the invention with second outflow orifices which are opened for the outflow of gases.
Figure 11:
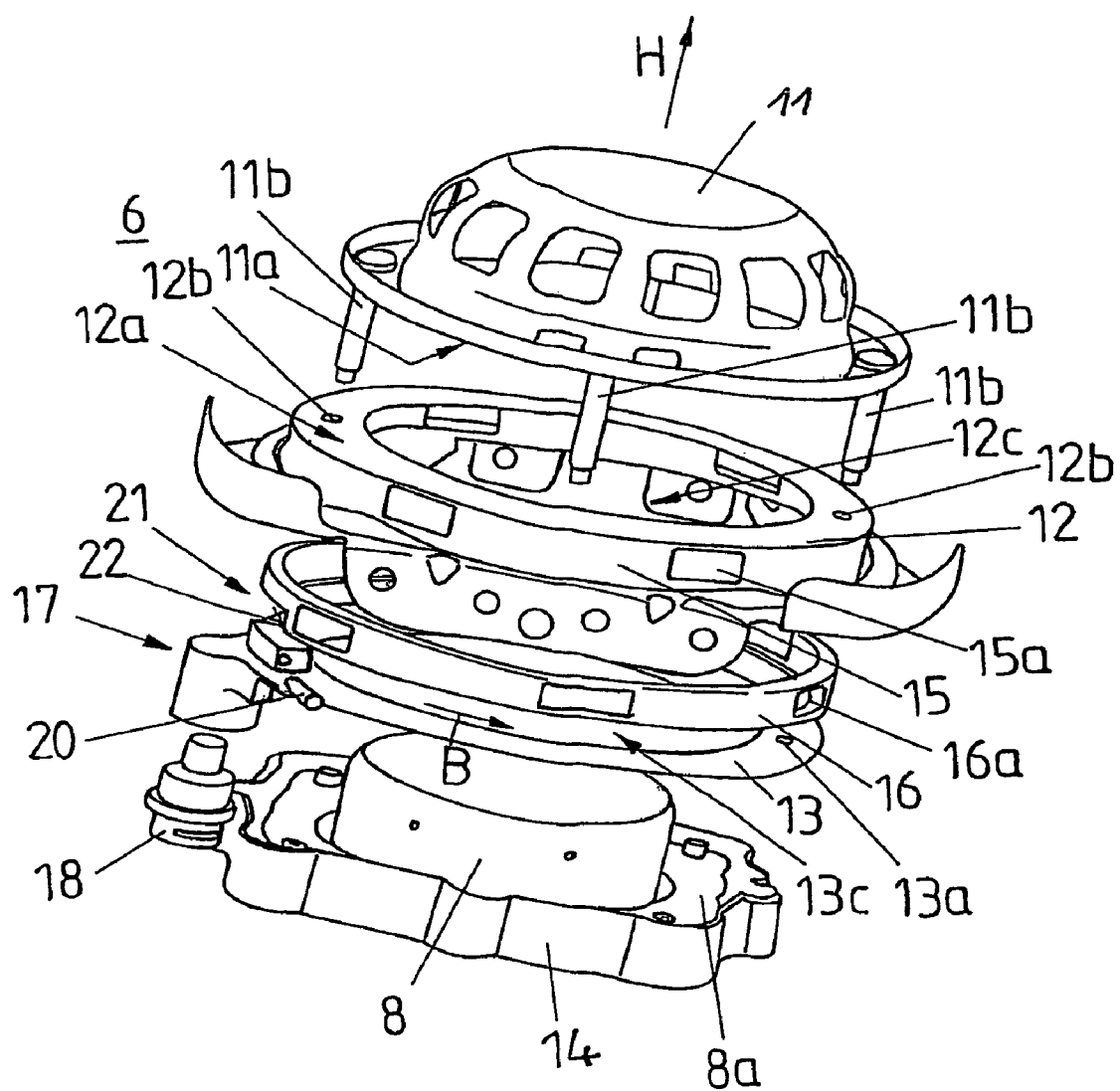
FIG. 11 shows a perspective exploded view of the airbag module shown in FIG. 9 and FIG. 10.

FIG. 9 shows, in conjunction with FIG. 10 and FIG. 11, a further modification of the airbag module 6 shown in FIG. 5 and FIG. 8, in which, in contrast to FIG. 5 or FIG. 8, a recess 21 on the ring 16 is provided, which does not interrupt the ring 16. The ring 16 may be closed on itself, so that the piston 20, which presses against the margin 22 of this recess 21 in order to move the ring 16, pushes the ring 16 in the movement direction B. So that, in this instance, the ring 16 is deformed to a lesser extent by the piston 20 during displacement with respect to the wall 15, said ring has perpendicularly to the movement direction B an essentially U-shaped cross section or a comparable profiling.

FIG. 12 shows, in conjunction with FIG. 13 and FIG. 14, an alternative variant of an airbag module 6, in which, in contrast to FIG. 5, FIG. 8 and FIG. 11, the movable element is not formed by a ring 16, but, instead, by the gas generator 8 itself, which is displaceable between two positions in the main deployment direction H. In contrast to FIGS. 5, 8 and 11, a bottom plate 13 may in this case be dispensed with. The chamber 9 surrounding the gas generator 8 is in this instance formed by at least one first and one second chamber element, to be precise the generator carrier 12 as the first chamber element, which in the main deployment direction H lies opposite the carrier 14 of trough-shaped design as the second chamber element, on which is formed a central gas generator recess 14a, through which a free end region of the gas generator 8 projects in the main deployment direction H, the gas generator 8 having a flange 8a which runs continuously around the gas generator 8 and projects from the gas generator 8 and via which the gas generator 8 is mounted on a marginal region which runs continuously around the gas generator recess 14a and which in the main deployment direction H lies opposite an injection orifice 3, not shown, of the airbag 1 of the airbag module 6 and faces said injection orifice.

The carrier 14 has a continuous marginal region 14c which faces the generator carrier 12 in the main deployment direction H and which may bear against the generator carrier 12 to form the chamber 9 surrounding the gas generator 8.

The cap-shaped diffuser 11 is seated on the central orifice 12c of the generator carrier 12, and, as described above, the airbag 1 is clamped, with its marginal region running continuously around the injection orifice 3, between the diffuser 11 and the generator carrier 12. As described above, fastening elements 11b project from the diffuser 11. Fastening elements 11b are led through holes 12b of the generator carrier 12, through holes 14b of the carrier 14, and through long holes 24a of a locking element 24. Fastening elements 11b and are screwed together by nuts 25 that extend longitudinally in the main deployment direction H.

When screwed together with the fastening mechanisms 11b, the nuts 25 are introduced in the main deployment direction H into the long holes 24a of the locking element 24 and into the holes 14b of the carrier 14 which are in alignment with the fastening elements 11b, so that the carrier 14 may slide in the main deployment direction H on the nuts 25 in the main deployment direction H. The nuts 25 form guide elements for the gas generator 8 and the carrier 14 (second chamber element) which may thereby be led, in a movement direction B opposite to the main deployment direction H, through the guide elements 25 by pressure acting during the inflation of the airbag 1.

The locking element 24 is provided to fix the gas generator 8 in its initial position (e.g., with the second outflow orifice closed). The locking element 24 engage the guide elements 25 so that the gas generator 8 may press with the carrier 14 against the locking element 24 in the movement direction B. The locking element is held in its initial position with respect to the injection orifice 3, and the carrier 14 connected to the gas generator 8 via the flange 8a of the gas generator 8 bears with its marginal region 14c facing the generator carrier 12 against the generator carrier 12. No gas or only comparatively insignificant quantities of gas may escape in the main deployment direction H between the carrier 14 and the generator carrier 12 out of the chamber 9 surrounding the gas generator 8. Because the gas is substantially sealed within the chamber 9 by the marginal region 14c bearing against the generator 12, the marginal region 14c of the carrier 14 does not need to bear sealingly against the generator carrier 12.

The locking element 24 is unlocked by movement generation device 26. Movement generation device 26 provides an excess pressure in a pressure chamber with an igniter 27. The excess pressure presses a piston 28 out of the pressure chamber of the movement generation device 26 in an unlocking direction E oriented transversely with respect to the movement direction B of the gas generator 8.

The piston 28 of the movement generation device 26 is arranged to displace locking element 24 linearly in the unlocking direction E. The locking element 24 thereby comes out of engagement with notches 25a of the guide elements 25, so that, as a result of the pressure which acts during the inflation of the airbag 1, the gas generator 8 is spaced apart from the injection orifice 3 of the airbag 1 in the movement direction B. In this case, the carrier 14, specifically its marginal region 14c, connected to the gas generator 8 moves away from the generator carrier 12, to form between the marginal region 14c of the carrier 14 and the generator carrier 12 a gap which runs continuously around the gas generator 8 and which forms the second outflow orifice 15a. This position of the gas generator 8 or of the carrier 14 is illustrated in FIG. 12. By contrast, FIG. 13 shows in the initial position of the gas generator 8 or of the carrier 14 a marginal region 14c of the carrier 14 bearing against the generator carrier 12. This corresponds to a closed second outflow orifice 15a.

FIG. 15 shows a detail of the airbag module 6 illustrated in FIGS. 12 to 14, specifically the principle on which the locking element 24 of essentially annular design, which lies opposite the carrier 14 in the main deployment direction H, may be brought into engagement with the guide elements 25.

The locking element 24 has the long holes 24a which extend in the unlocking direction E, the long holes A widening in the unlocking direction E and in each case having correspondingly a narrow region 24c which lies opposite a widened region 24b of a long hole 24a in the unlocking direction E and is divided off from this widened region 24b by a contraction.

The notches 25a of the guide elements 25 are of annular design and run continuously around the guide elements 25 transversely with respect to the movement direction B. The outside diameter of the notches 25a of the guide elements 25 is exactly such that the guide elements 25 may be pressed with their notches 25a into the narrow regions 24c of the long holes 24a and, owing to the contractions between the narrow regions 24c and the widened regions 24b, latch into the narrow regions 24c. In this position, then, the guide elements 25 may no longer be displaced in the movement direction B. To open the second outflow orifice 15a (e.g., the carrier 14 and the gas generator 8 move away from the generator carrier 12 in the movement direction B) the igniter 27 is ignited and the piston 28 is thereby pressed in the unlocking direction E against the locking element 24. The narrow regions 24c of the long holes 24a are pressed out of the notches 25a of the guide elements 25 and the widened regions 24b are displaced toward the guide elements 25. The locking element 24 thus comes out of engagement with notches 25a of the guide elements 25, since the outside diameter of the guide elements 25, spaced apart from the notches 25a, is smaller than the diameter of the widened regions 24b of the long holes 24a. The locking element 24 may then slide, together with the carrier 14 and the gas generator 8 fastened to it, on the guide elements 25 in the movement direction B.

Figure 18:
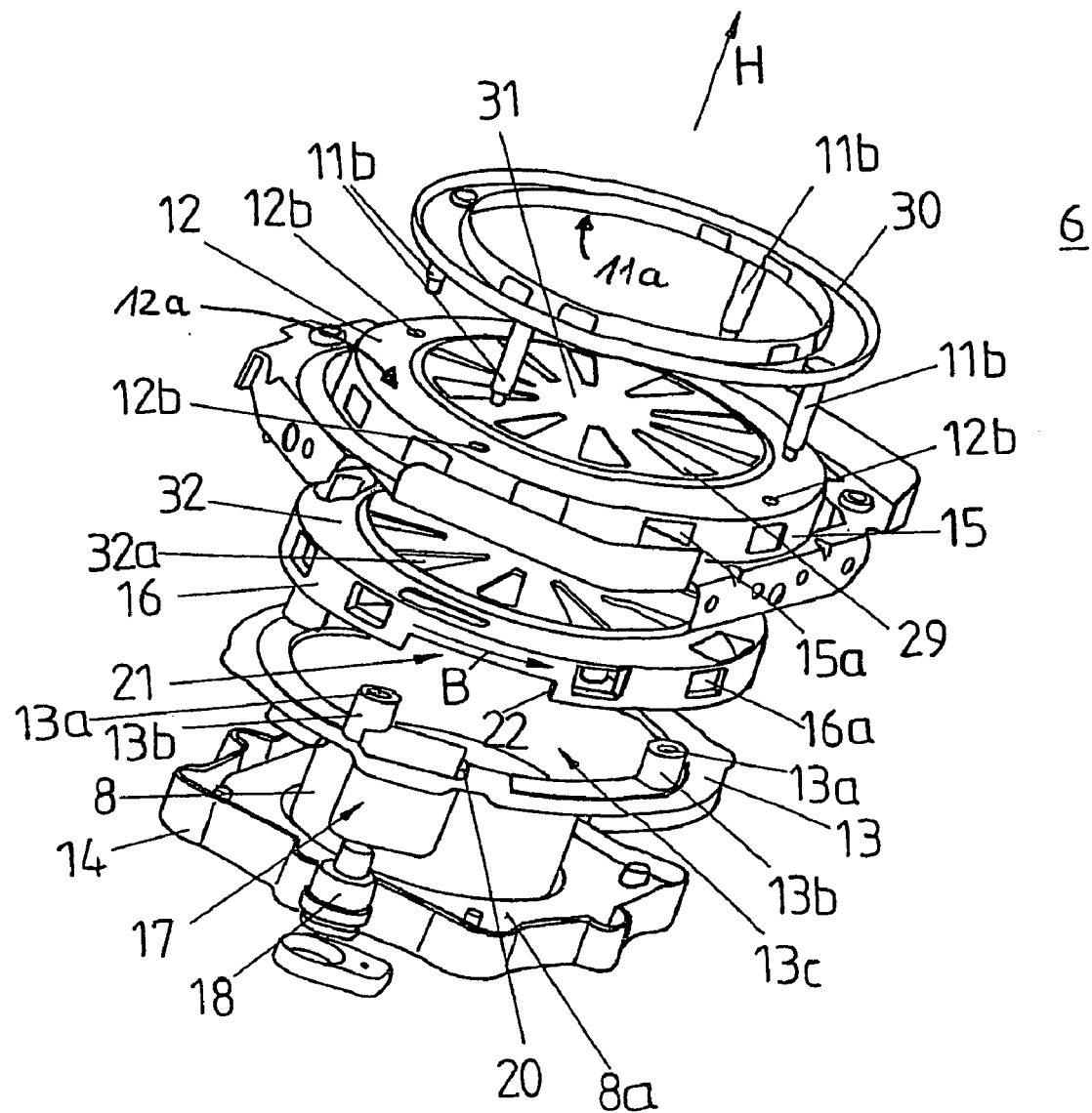
FIG. 18 shows a perspective exploded view of the airbag module shown in FIG. 16 and FIG. 17.

FIG. 16 shows, in conjunction with FIG. 17 and FIG. 18, a perspective view or exploded view of an extract of an airbag module 6, the generator carrier 12 of which, in contrast to the above-illustrated embodiments of the generator carrier 12, has no permanently open central orifice 12c, but, instead, a plurality of flow-out orifices 29 which are arranged in a radiating manner and through which gas may pass out of the chamber 9 of the airbag module 26 through the injection orifice 3 into the airbag 1. The flow-out orifices 29 face the injection orifice 3 in the main deployment direction H of the airbag 1 and lie opposite this in the main deployment direction H.

The gas which passes through flow-out orifices 29 in order to inflate the airbag 1 is swirled owing to the special configuration of the flow-out orifices 29, so that the diffuser 11 may be dispensed with. The airbag module 6 illustrated in FIGS. 16 to 18 has only a clamping ring 30 on which is formed (see FIG. 5) the marginal region 11a which faces the generator carrier 12 and which presses a marginal region, running continuously around the injection orifice 3, of the airbag 1 against the generator carrier 12 and thus secures the airbag 1 to the generator carrier 12.

The fastening elements 11b project from the clamping ring 30 in the main deployment direction H correspondingly to the embodiments of the airbag module 6 which were described above.

To close the flow-out orifices 29 of the generator carrier 12, in contrast to FIGS. 2 to 11, the ring 16 has formed on it a valve plate 32 having a plurality of orifices 32a which may be brought into congruence with the flow-out orifices 29 of the flow-out region 31 of the generator carrier 12. The valve plate 32, together with the ring 16 fastened to the valve plate 32 (the ring 16 and valve plate 32 may be produced in one piece), may be rotated in a movement direction B running transversely with respect to the main deployment direction H. The valve plate 32 may be rotated about an axis which is perpendicular to the valve plate 32 and which coincides with the main deployment direction H, while the orifices 32a of the valve plate 32 may be brought into congruence with the flow-out orifices 29 of the flow-out region 31—the flow-out orifices 29 are opened—or the flow-out orifices 29 may be closed completely by the valve plate 32. Since the valve plate 32 is coupled to the ring 16, the valve plate 32 may be moved in the movement direction B via the movement generation device 17 illustrated in FIGS. 2 to 11. The second outflow orifices 15a of the cylindrical wall 15 of the generator carrier 12 are opened when the flow-out orifices 29 are closed by the valve plate 32. The outflow orifices 15a are closed by the ring 16 when the flow-out orifices 29 are opened (e.g., congruent with the orifices 32a formed on the valve plate 32).

It is, of course, also possible to combine the embodiments described above with one another. The gas generator 8 may be movable in the movement direction B according to FIG. 14, while, in addition, the central orifice 12c of the generator carrier 12 may include an outflow region 31 with corresponding flow-out orifices 29 according to FIG. 18, so that the central orifice 12b, illustrated in FIG. 14, of the generator carrier 12 may be closed by a valve plate 32. A movement generation device according to FIG. 7 is provided so that one or more orifices in the generator carrier 12 may be closed.

The priority application, German patent application no. DE 10 2005 027910.4, filed Jun. 10, 2005 including the specification, drawings, claims and abstract, is incorporated herein by reference in its entirety. The priority application, German patent application no. DE 20 2005 020687.3, filed Dec. 15, 2005 including the specification, drawings, claims and abstract, is incorporated herein by reference in its entirety.

What is claimed is:

1. An airbag module for a motor vehicle, comprising:
   a cover for receiving an airbag, said cover separating an outside space of the airbag module from an inside space of the airbag module,
   an airbag that may be inflated with gas through an injection orifice in order to protect an occupant, and may be deployed through an openable region of the cover into the outside space of the airbag module, wherein the airbag includes a first outflow orifice arranged in the inside space of the airbag module when the airbag is inflated so that gas emerging from the first outflow orifice passes through the openable region of the cover into the outside space, and
   a gas generator for inflating the airbag, the gas generator configured to generate inflation gas that emerges from at least one gas outlet orifice of the gas generator and passing through the injection orifice into the airbag,
   wherein the airbag module includes a second openable outflow orifice, that is formed on a chamber surrounding the gas generator and is in fluid communication with the gas outlet orifice of the gas generator so that the gas flowing out through the gas outlet orifice is conducted at least partially into the outside space, the second outflow orifice being arranged so that gas emerging from the second outflow orifice passes into the inside space and from there through the openable region into the outside space.

2. The airbag module as claimed in claim 1, wherein the second outflow orifice of the airbag module is assigned an element which is movable at least between two different positions and as a result of whose movement between the two positions the second outflow orifice is connectable in a gas-conducting manner to the gas outlet orifice of the gas generator such that the gas flowing out through the gas outlet orifice is conducted at least partially into the outside space.

3. The airbag module as claimed in claim 2, wherein the movable element comprises the gas generator.

4. The airbag module as claimed in claim 3, wherein the gas generator is connected to the chamber such that the second outflow orifice is released as a result of a movement of the gas generator in the movement direction.

5. The airbag module as claimed in claim 4, wherein the movement of the gas generator in the movement direction is facilitated by pressure generated during the outflow of the gas.

6. The airbag module as claimed in claim 4, wherein the chamber is formed from at least a first and a second chamber element which are mounted movably with respect to one another in the movement direction.

7. The airbag module as claimed in claim 6, wherein the two chamber elements are mounted movably with respect to one another via guide elements extending longitudinally in the movement direction.

8. The airbag module as claimed in claim 6, wherein the airbag is secured to the first chamber element.

9. The airbag module as claimed in claim 6, wherein the gas generator is connected to the second chamber element.

10. The airbag module as claimed in claim 6, wherein the gas generator is connected to the second chamber element such that the second chamber element is spaced apart from the first chamber element as a result of a movement of the gas generator in the movement direction, so that the second outflow orifice is formed between the two chamber elements in the movement direction.

11. The airbag module as claimed in claim 2, wherein the movable element is mounted movably on the chamber such that the second outflow orifice may be closed by the movable element.

12. The airbag module as claimed in claim 11, wherein the chamber has a cylindrical wall in which the second outflow orifice is arranged.

13. The airbag module as claimed in claim 12, wherein the movable element has a cylindrical ring with a clearance, the ring being arranged displaceably on the wall of the chamber such that the clearance may be brought into congruence with the second outflow orifice as a result of a displacement of the ring along the wall.

14. The airbag module as claimed in claim 13, wherein, to displace the ring in the movement direction, the ring has a recess with a margin oriented transversely with respect to the movement direction.

15. The airbag module as claimed in claim 14, wherein the recess is a gap which interrupts the ring and which extends transversely with respect to the movement direction.

16. The airbag module as claimed in claim 14, wherein a further recess in the form of a gap interrupting the ring extends along the margin of the recess.

17. The airbag module as claimed in claim 11, wherein the movable element may be moved by a movement generation device.

18. The airbag module as claimed in claim 17, wherein the movement generation device has a piston which presses against the margin of the recess in order to displace the ring in the movement direction.

19. The airbag module as claimed in claim 11, wherein the chamber has a closable flow-out orifice through which gas may pass into the airbag in order to inflate the airbag.

20. The airbag module as claimed in claim 19, wherein the flow-out orifice is arranged on a flow-out region, facing the airbag, of the chamber.

21. The airbag module as claimed in claim 11, wherein the movable element has a valve plate with an orifice, the valve plate being arranged displaceably on the wall of the chamber such that the orifice may be brought into congruence with the flow-out orifice as a result of a displacement of the valve plate along the flow-out region.

22. The airbag module as claimed claim 21, wherein the valve plate is secured to a continuous margin, facing the airbag, of the ring.

23. The airbag module as claimed in claim 22, wherein the orifice of the valve plate is arranged with respect to the clearance of the ring such that the flow-out orifice is closed by the valve plate when the second outflow orifice is open, and in that the flow-out orifice is open when the second outflow orifice is closed by the ring.

24. The airbag module as claimed in claim 1, wherein the gas outlet orifice of the gas generator is in fluid communication with the second outflow orifice such that the gas flowing out through the gas outlet orifice is conducted completely into the outside space.

25. The airbag module as claimed in claim 1, wherein the second outflow orifice is arranged such that gas emerging from the second outflow orifice passes directly into the inside space outside the airbag and from there through the openable region into the outside space.

26. The airbag module as claimed in claim 1, wherein, for the discharge of gas, the airbag has a third outflow orifice which, with an airbag deployed, is arranged in the outside space of the airbag module.

27. The airbag module as claimed in claim 26, wherein, in the inflated state of the airbag, the third outflow orifice is arranged on a side of the airbag which faces the airbag module.

28. The airbag module as claimed in claim 26, wherein, for the discharge of gas, the airbag has a further third outflow orifice which, with an airbag deployed, is arranged in the outside space of the airbag module.

29. The airbag module as claimed in claim 28, wherein, in the inflated state of the airbag, the further third outflow orifice lies opposite the third outflow orifice transversely with respect to a main deployment direction of the airbag.

30. The airbag module as claimed in claim 1, wherein the movable element is displaceable in a movement direction running parallel to a main deployment direction of the airbag.

31. The airbag module as claimed in claim 1, wherein the movable element is displaceable and/or rotatable in a movement direction running parallel to the injection orifice.

32. The airbag module as claimed in claim 1, characterized by a releasable locking element for securing the gas generator.

33. The airbag module as claimed in claim 32, wherein the locking may be brought into engagement with the guide elements in order to secure the gas generator.

34. The airbag module as claimed in claim 33, wherein the locking element may be brought at least partially out of engagement with the guide elements by linear movement in an unlocking direction running transversely with respect to the movement direction.

35. The airbag module as claimed in claim 34, wherein the locking element has long holes which extend longitudinally in the unlocking direction and into which the guide elements engage in order to secure the gas generator with respect to the injection orifice.

36. The airbag module as claimed in claim 34, wherein the airbag module includes a movement generation device for generating the linear movement of the locking element.

37. The airbag module as claimed in claim 36, wherein the movement generation device has a piston which presses against the locking element in the unlocking direction in order to release the locking element.

* * * * *